US012558716B2

(12) United States Patent
Gregg et al.

(10) Patent No.: US 12,558,716 B2
(45) Date of Patent: Feb. 24, 2026

(54) IN-SITU MYCOREMEDIATION SYSTEM AND PROCESS

(71) Applicant: Seas Geosciences, LLC, Signal Hill, CA (US)

(72) Inventors: John Gregg, Signal Hill, CA (US); Laura Gregg, Signal Hill, CA (US); James Gregg, Signal Hill, CA (US)

(73) Assignee: Seas Geosciences, LLC, Signal Hill, CA (US)

( * ) Notice: Subject to any disclaimer, the term of this patent is extended or adjusted under 35 U.S.C. 154(b) by 0 days.

(21) Appl. No.: 19/220,224

(22) Filed: May 28, 2025

(65) Prior Publication Data

US 2025/0281956 A1      Sep. 11, 2025

Related U.S. Application Data

(63) Continuation of application No. 17/856,402, filed on Jul. 1, 2022, now Pat. No. 12,330,195.

(60) Provisional application No. 63/217,756, filed on Jul. 1, 2021.

(51) Int. Cl.
*C02F 3/34*       (2023.01)
*B09C 1/10*       (2006.01)
*C02F 103/06*     (2006.01)

(52) U.S. Cl.
CPC .............. *B09C 1/105* (2013.01); *C02F 3/347* (2013.01); *B09C 2101/00* (2013.01); *C02F 2103/06* (2013.01)

(58) Field of Classification Search
CPC ..... B09C 1/105; B09C 2101/00; C02F 3/347; C02F 2103/06

USPC ....... 210/602, 601, 605, 610, 611, 620, 628, 210/170.04, 171, 173, 174, 191, 416.1, 210/446
See application file for complete search history.

(56) References Cited

U.S. PATENT DOCUMENTS 5,631,160 A * 5/1997 Bruso ..................... E02F 5/282
                                                      405/303
10,907,143 B2  2/2021 Kucharzyk et al.

FOREIGN PATENT DOCUMENTS

WO     WO 2021/228351 A1    11/2021

OTHER PUBLICATIONS

Battelle Memorial Institute 2022; Encapsulating Fungal Enzymes for Safer Oil Remediation case study; case study; downloaded on Jun. 29, 2022, at: https://www.battelle.org/insights/case-studies/case-study-details/encapsulating-fungal-enzymes-for-safer-oil-remediation; pp. 1-5.

* cited by examiner

*Primary Examiner* — Madeline Gonzalez

(57)                    ABSTRACT

An in-situ mycoremediation system and process is provided, including a device with a rod casing having a top end, a bottom end, and a sidewall with one or more perforations, the sidewall defining an internal channel that extends from an intake opening on the top end to the one or more perforations, a sleeve that extends around at least part of the rod casing and that is slidable between at least a first position that covers the one or more perforations and a second position that at least partly uncovers the one or more perforations, and a plumbing line linked to the intake opening and configured to facilitate forcible injection of one more fungal mixtures and/or air via the one or more perforations when the sleeve is in the second position.

20 Claims, 9 Drawing Sheets

Figure 9:
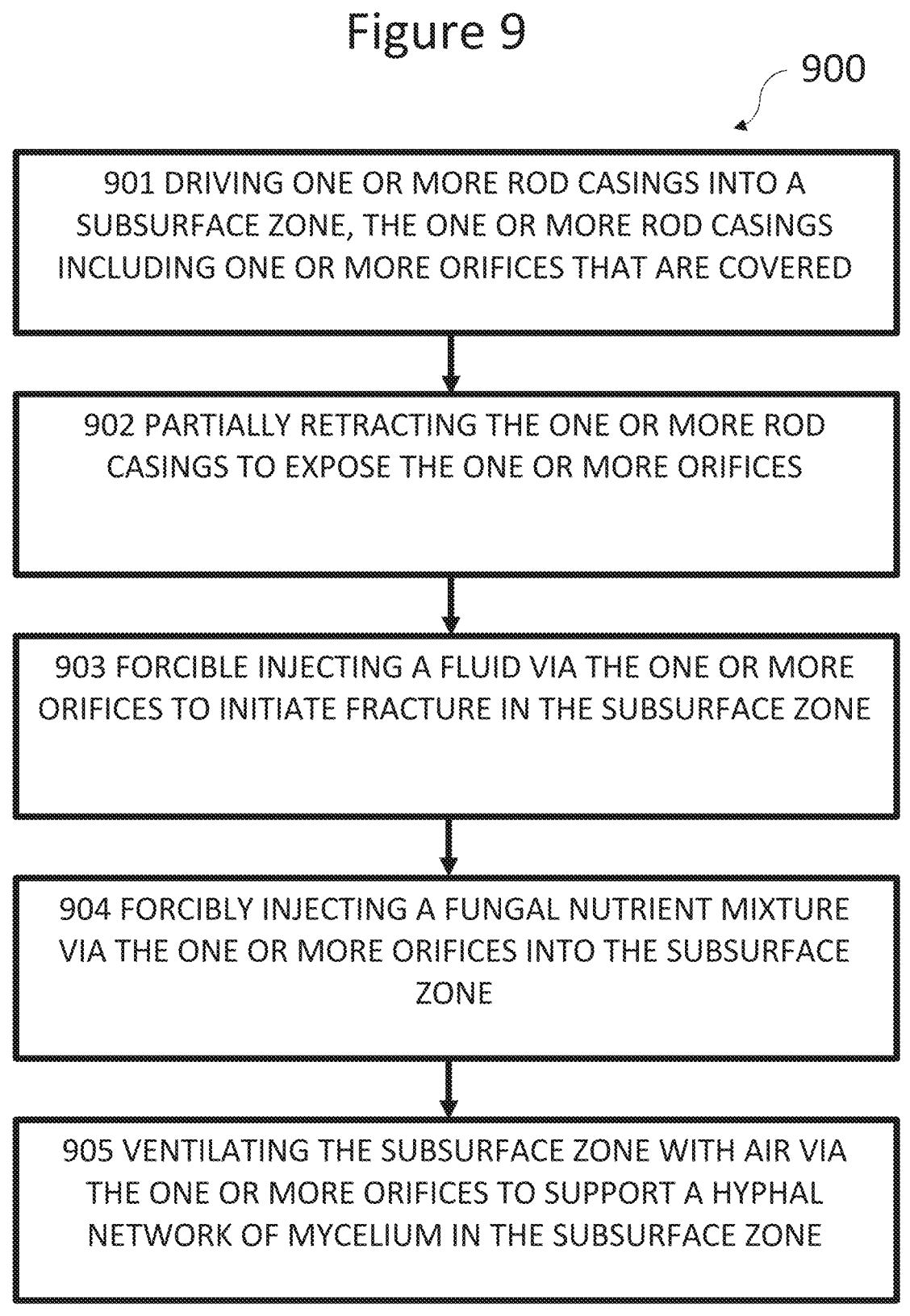

901 DRIVING ONE OR MORE ROD CASINGS INTO A SUBSURFACE ZONE, THE ONE OR MORE ROD CASINGS INCLUDING ONE OR MORE ORIFICES THAT ARE COVERED

902 PARTIALLY RETRACTING THE ONE OR MORE ROD CASINGS TO EXPOSE THE ONE OR MORE ORIFICES

903 FORCIBLE INJECTING A FLUID VIA THE ONE OR MORE ORIFICES TO INITIATE FRACTURE IN THE SUBSURFACE ZONE

904 FORCIBLY INJECTING A FUNGAL NUTRIENT MIXTURE VIA THE ONE OR MORE ORIFICES INTO THE SUBSURFACE ZONE

905 VENTILATING THE SUBSURFACE ZONE WITH AIR VIA THE ONE OR MORE ORIFICES TO SUPPORT A HYPHAL NETWORK OF MYCELIUM IN THE SUBSURFACE ZONE

IN-SITU MYCOREMEDIATION SYSTEM AND PROCESS

PRIORITY CLAIM

This application is a continuation of U.S. non-provisional patent application Ser. No. 17/856,402 filed Jul. 1, 2022, titled IN-SITU MYCOREMEDIATION SYSTEM AND PROCESS (DOCKET GD-P-03-00-NP-01-0000), which application is a non-provisional patent application of U.S. provisional patent application 63/217,756 filed Jul. 1, 2021, titled SYSTEM AND PROCESS FOR MYCOREMEDIATION (DOCKET GD-P-03).

This application claims the benefit of and/or priority to each of the foregoing patent applications and any and all parent, grandparent, and great-grandparent applications thereof. The foregoing patent applications are incorporated by reference in their entirety as if fully set forth herein.

FIELD OF INVENTION

Embodiments of the invention relate generally to contamination remediation and, more specifically, to an in-situ mycoremediation system and process.

BACKGROUND

Heavy metals and toxic chemicals and pollutants from human activity accumulate in our soil and water. These contaminants can damage the environment, end up in our food chain, and bioaccumulate in humans, contributing to a wide array of development and health issues.

Mycoremediation is a method that utilizes fungi mycelium as a remedial treatment to restore balance in soil and water. Mycelium refers to the ultra-fine and dense network of branching thread-like white hyphae that is the vegetative part of the fungi. As mycelium spreads, it secrets enzymes including peroxidases, liginases, cellulases, pectinases, xylanases, and oxidases. These enzymes break down and remove a wide array of contaminants, including heavy metals, organic pollutants, textile dyes, leather tanning chemicals, wastewater, petroleum fuels, polycyclic aromatic hydrocarbons, pharmaceuticals, personal care products, pesticides, herbicides, and others. Furthermore, fungi mycelium can also act as a filter to extract and hyperaccumulate contaminants.

There are two primary techniques of mycoremediation: ex-situ and in-situ. Ex situ techniques involve excavating contaminants from polluted sites and subsequently transporting them to another site for treatment. In-situ techniques involve treating contaminants at the site of pollution. Ex-situ mycoremediation tends to be expensive due in part to additional costs attributed to excavation and transportation. Ideally, in-situ techniques ought to be less expensive and more efficient as compared to ex-situ mycoremediation techniques, but challenges of inoculating subsurface locations with fungi mycelium, especially soil with low permeability or deeper contamination, has been an obstacle.

SUMMARY

This disclosure relates generally to contamination remediation and, more specifically, to an in-situ mycoremediation system and process.

In one embodiment, a device for in-situ mycoremediation includes, but is not limited to, a rod casing having a top end, a bottom end, and a sidewall with one or more perforations, the sidewall defining an internal channel that extends from an intake opening on the top end to the one or more perforations; a sleeve that extends around at least part of the rod casing and that is slidable between at least a first position that covers the one or more perforations and a second position that at least partly uncovers the one or more perforations; and a plumbing line linked to the intake opening and configured to facilitate forcible injection of one more fungal mixtures and/or air via the one or more perforations when the sleeve is in the second position.

In another embodiment, a system for in-situ mycoremediation includes, but is not limited to, a set of rod casings each having one or more perforations, the set of rod casings configured to be distributedly driven into a subsurface zone; a pump; and one or more plumbing lines that link the pump to the set of rod casings to facilitate forcible injection of one more fungal mixtures and/or air via the one or more perforations into the subsurface zone.

In a further embodiment, a process for in-situ mycoremediation includes, but is not limited to, driving one or more rod casings into a subsurface zone, the one or more rod casings including one or more orifices that are covered; partially retracting the one or more rod casings to expose the one or more orifices; forcible injecting a fluid via the one or more orifices to initiate fracture in the subsurface zone; forcibly injecting a fungal nutrient mixture via the one or more orifices into the subsurface zone; and ventilating the subsurface zone with air via the one or more orifices to support a hyphal network of mycelium in the subsurface zone.

BRIEF DESCRIPTION OF DRAWINGS

FIG. 9 is a flow diagram of a process for mycoremediation, in accordance with an embodiment of the invention.

DETAILED DESCRIPTION

Figure 1:
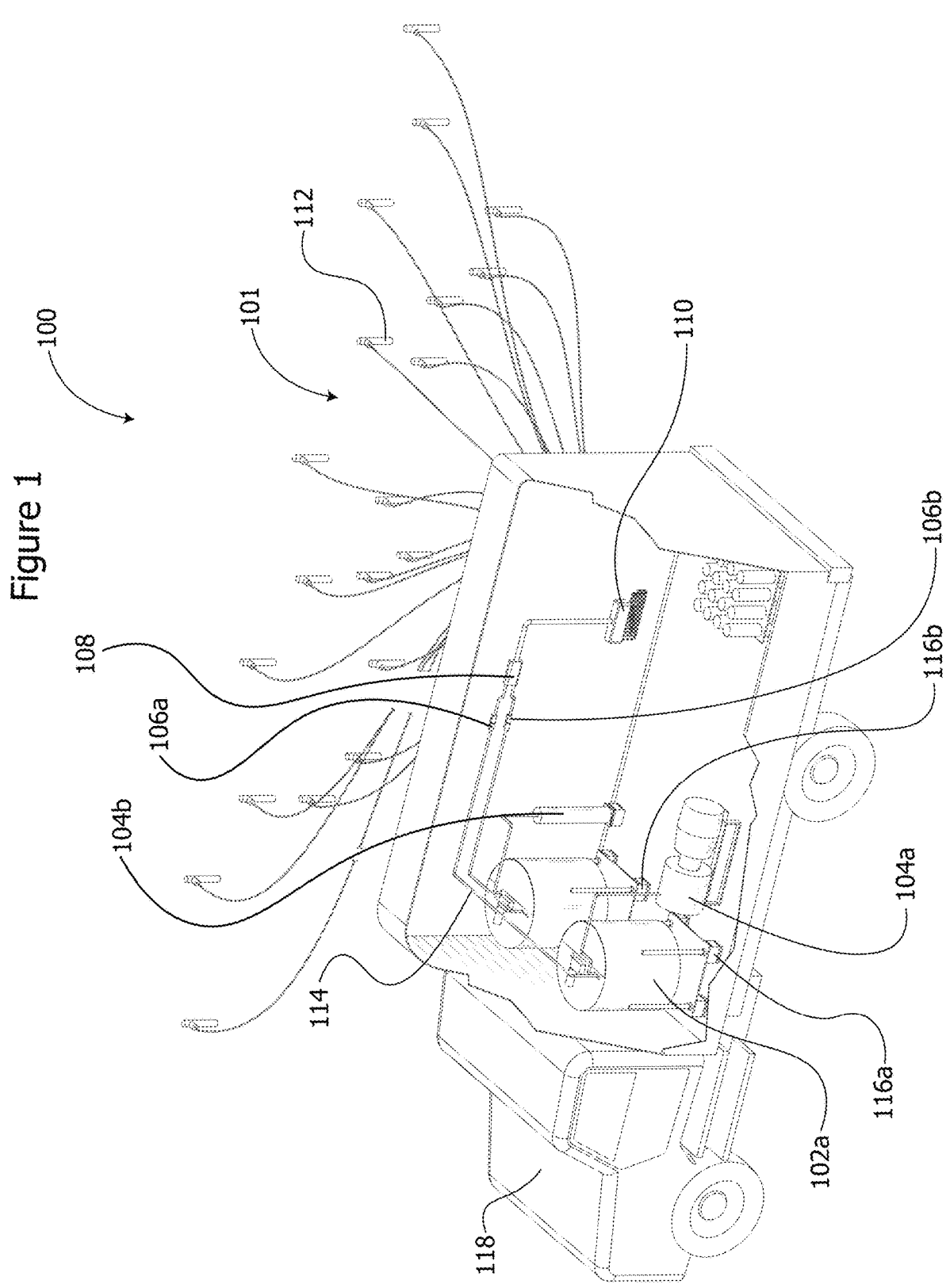
FIG. 1 is an environmental view of an injection remediation system, in accordance with an embodiment.

This disclosure relates generally to contamination remediation and, more specifically, to in-situ mycoremediation. In one embodiment, a system, device, and process are provided to use fungi to alter subsurface conditions in a beneficial manner. By inoculating the soil with one or more species of fungi, different goals can be realized. Certain embodiments are set forth in the following description and in FIGS. 1-9 and APPENDIX A and B provide a thorough understanding of such embodiments. APPENDIX A and B are incorporated by reference fully herein.

Many pollutants, such as solvents, fuels, PFAS, dyes, pharmaceuticals, herbicides, heavy metals, detergents, cyanotoxins and a large percentage of the world's polycyclic aromatic hydrocarbons (PAHs) exist in marine and terrestrial subsurface zones such as vadose zones, sediment, groundwater and even mangrove systems, including substrates such as dirt, sediment, silty sand, sand, and silt.

Certain fungal species are usable to degrade pollutants in subsurface environments where contamination has migrated. For example, white-rot fungi (ligninolytic) secrete enzymes to catalyze the oxidation of PAH into quinones, which then further degrade, by ring fission, into CO2. Other species such as *Phanerochaete chrysosporium* and *Pleurotus* ostreatus are also usable. *Pleurotus* ostreatus and *Trametes villosa* and *Coriolopsis* can degrade crude oil. Genera *Aspergillus* and *Botrytis* can degrade agricultural contaminants (i.e., insecticides, herbicides, and livestock hormones).

Biochemical actions of fungi occur through excretion of organic acids and other metabolites. For example, arbuscular mycorrhizal fungi (AMF) live in symbiotic association with plants through the roots and excrete proteins and acids that alter soil and sediment structure and increase connectivity across soil pores and also increase plant tolerance of saline substrates. Wood-rotting (decomposer) fungi physically influence substrate structure by weaving mycelium through the substrate and chemically by excreting ligninocellulosic enzymes (including lignin peroxidase (LiP), manganese peroxidase (MnP) and laccase) which break down complex carbon-based chains into shorter chains increasing substrate permeability and facilitating biodegradation of organic contaminants by bacteria and other microbes. Anaerobic (or low oxygen needs) yeasts and molds and other fungi have been isolated from the types of environmental conditions where contaminants are found, including saline sediments and aquatic environments with oil spills. Other extremophilic molds and yeasts, including black yeasts, have been isolated from groundwater environments.

To increase effectiveness of fungal species in degradation of pollutants, in one particular instance, an innovative approach is used to create robust growth of fungi in a hyphal network for mycoremediation. In aquatic or terrestrial environments, soil porosity, permeability, and hydraulic conductivity are first increased by fracturing a subsurface with a first fluid, such as a carbon solution, at a high pressure. Then, a slurry of fungi with a food source is disbursed into the disturbed subsurface under a pressure that is lower than that of the first fluid to initiate and support colonization and/or formation of a matrix of mycelium. The matrix of mycelium itself increases soil porosity and produces extracellular ligninolytic enzymes that breakdown and degrade pollutants. Further, the matrix of mycelium acts to absorb and/or filter various pollutants, such as heavy metals to support remediation. Additionally, the area of influence can be increased via the addition of more sugar solution to encourage the migration of fungus. More solution may be added to the original injection pipe, or via one or more additional injection pipes to encourage hyphal fungal growth. Additionally, either before, after, or during any of the foregoing operations, an optional injection of oxygen or air can be forcibly injected to the subsurface or encouraged through venting. It is also possible to restrict access to air in the subsurface for anoxic substrates.

Porosity is a measure of the void spaces in a substrate and permeability is a measure of the ability of a substrate to transmit fluids. Poor substrate permeability and porosity can limit microbe's ability to access contaminants in subsurface environments and break them down. An increase in porosity can be accomplished using the high pressure fluid, but certain fungi are known to alter substrate permeability and porosity and act as 'geologic agents'. Thus, the initial high pressure fluid injection operation may be supplemented or omitted in favor of a fungal slurry pressure injection that itself increases soil porosity and forms a matrix of mycelium to break down pollutants.

Methods and devices for introducing the fungus into the soil matrix can vary depending on soil conditions. In one embodiment, an injection pipe of about 1.5-inch diameter is driven or vibrated into the ground with a "direct push" type rig, often a Geoprobe. As the zone of interest is reached, the rods are retracted slightly (e.g. 18-inches), which exposes a series of injection slots in the drive pipe. A propagation notch is started using pressurized water. This notch is about 4 to 6-inches deep into the lateral soil horizon. An inoculation fluid is then pumped into the pipe under pressure until the overburden pressure of the soil is exceeded and the horizon fractures. The lateral fracture then extends out horizontally and is approximately 1-inch wide and has approximately a 30-degree radial expression. Thus, the tooling has the capability to inject both aqueous and viscous slurry solutions, such as those including grain/sawdust material. In certain embodiments, this tooling allows for higher hydraulic pressure to help create fractures in low porosity soils and allows for lower hydraulic pressure to support injection of mycelium and/or enzymes at a lower sustained pressure.

The injection fluid or inoculation slurry can also vary depending on soil conditions and/or pollutants. In one particular embodiment, the inoculation contains a mixture of fungal spores and a sugar solution as a food source. Other slurries are usable for inoculation. For instance, ingredients may include one or more liquids, hagfish slime, wood, sawdust, grain spawn, EVO, and/or carbon. In one particular embodiment, a sawdust slurry is provided with one or more hardwoods and soybean hull. In another particular embodiment, a grain slurry is provided with one or more rye grains. In a further embodiment, a liquid slurry is provided with dextrose and malt.

Possible mediums delivered for mycoremediation in the subsurface may include mycelium, but optionally or alternatively may include any one or more of the following: liquid mycelium, solid-state mycelium on a carbon source, fungi-inoculated seedlings, and/or encapsulated enzymes. The table in APPENDIX A outlines usable mediums and species for use with various subsurface conditions.

Various injection equipment can be employed for injecting into a subsurface, including one or more injection pumps. Higher pressure pump(s) are usable to fracture soil prior to injecting mycelium and lower pressure pump(s) are usable for a liquid culture injection of mycelium/enzymes. Additionally, a pressurized atmospheric gas may be employed for pneumatic injection. Optionally, a progressive cavity pump or centrifugal pump can be employed.

FIG. 1 is an environmental view of an injection remediation system for injecting one or more liquids, slurries, and/or mixtures as illustrated and described herein, in accordance with an embodiment. In one embodiment, a system 100 for in-situ mycoremediation includes, but is not limited to, a set of rod casings 112 each having one or more perforations, the set of rod casings 112 configured to be distributedly driven into a subsurface zone 101; a pump 108; and one or more plumbing lines 114 that link the pump 108 to the set of rod casings 112 to facilitate forcible injection of one more fungal mixtures and/or air via the one or more perforations into the subsurface zone 101.

An injection remediation system 100 includes, but is not limited to, at least one reservoir 102a configured to contain material; at least one load sensor 116a supporting the at least one reservoir 102a; at least one dosing pump 106a operably coupled to the at least one reservoir 102a and configured to controllably source the material. In one particular embodiment, one or more plumbing lines 114 connect the at least one reservoir 102a to at least one injection pipe 112. In a further embodiment, at least one injection pump 108 is associated with the one or more plumbing lines 114 and is configured to pressurize the material. In a further embodiment, at least one manifold 110 includes one or more auxiliary ports configured to distribute the material. In yet another embodiment, the system 100 further includes at least one additional reservoir 102b configured to contain the same or different material; at least one additional load sensor 116b supporting the at least on additional reservoir 102b; and at least one additional dosing pump 106b operably coupled to the at least one additional reservoir 102b and configured to controllably source the different material. In certain embodiments, the system 100 is incorporated with vehicle 118.

In certain embodiments, injection system 100 provides or conducts in situ remediation of contaminant plumes in terrestrial or marine surfaces or subsurfaces. Using portable drilling and direct push machines, such as with a Geoprobe 7822DT/3230/420M, or Ditch Witch R300, injection pipes are driven or pushed into the subsurface. At various depths, the subsurface is fractured using compressed gas or pressurized fluid to initiate fluid or material flow into the target soil horizon. Depending on the contaminant of concern, various oxygenators, air or oxygen gas, and/or fungal mixtures are introduced into these fractures to facilitate mycoremediation. The various injection fluids or materials can be stored, mixed, or delivered using a portable injection platform. The platform, which can be truck, trailer, or vessel mounted, contains various raw material tanks, mix tanks, injection pumps, and/or control hardware and/or software.

In one embodiment, the vehicle 118 includes any car, truck, van, trailer, rig, ship, boat, underwater device, or any other manned or unnamed machine. The vehicle 118 as depicted includes a truck and trailer combination with an enclosed area for housing the injection remediation components. Within the trailer, the vehicle 118 includes a mixing tank/reservoir 102a, mixing tank/reservoir 102b, raw material tank 104a, and/or raw material tank 104b configured to source and/or mix injection materials or fluid. The dosing pump 106a and/or dosing pump 106b controllably source the injection materials using plumbing lines 114 connected to the mixing tank/reservoir 102a, mixing tank/reservoir 102b, raw material tank 104a, and/or raw material tank 104b. The sourced injection material is fed via the plumbing lines to an injection pump 108 that pressurizes and the injection material. The manifold 110 includes a plurality of output ports and distributes the injection material to a plurality of injection pipes 112 disposed in an injection mycoremediation area 101. Load sensor 116a and/or load sensor 116b are disposed under the mixing tank/reservoir 102a and/or mixing tank/reservoir 102b and are configured to provide weight output, respectively.

In certain embodiments, any components of the system 100 can be omitted, augmented, or differently arranged. For instance, either of the mixing tank/reservoir 102a and the mixing tank/reservoir 102b can be omitted or augmented to provide no mixing tanks and/or reservoirs, a single mixing tank and/or reservoir, or a plurality of mixing tanks and/or reservoir. Likewise, any of the raw material tank 104a and raw material tank 104b can be omitted or augmented to provide no raw material tanks, a single raw material tank, or a plurality of raw material tanks. Any mixing tanks and/or reservoir, such as mixing tank/reservoir 102a, can include zero, one, or a plurality of connected raw material tanks, such as raw material tank 104b, that are configured to source raw material ingredients. Similarly, any of the dosing pump 106a and dosing pump 106b can be omitted or augmented to provide zero, one, or a plurality of dosing pumps. Additionally, dosing pumps can be provided to source raw material from any of the raw material tanks, such as raw material tank 104b, for any mixing tank/reservoir, such as mixing tank/reservoir 102a. Thus, a dosing pump, such as dosing pump 106b, can be positioned to source raw materials from a raw material tank and/or a mixing tank and/or reservoir. Additionally, a dosing pump, such as dosing pump 106a, can be positioned to transfer mixed material from one mixing tank/reservoir to another mixing tank/reservoir, such as from mixing tank/reservoir 102a to mixing tank/reservoir 102b. In other embodiments, the injection pump 108 can be augmented or differently positioned. For instance, a plurality of independent injection pumps can be provided for each mixing tank/reservoir, such as mixing tank/reservoir 102a, and/or each raw material tank, such as raw material tank 104. The injection pumps can also be combined in parallel and/or in series, and can be disposed downstream of any manifold, such as manifold 110. In further embodiments, the plumbing lines 114 are different configured. For example, plumbing lines 114 can connect each of the mixing tank/reservoir 102a and mixing tank/reservoir 102b independently to the injection pump 108 for combination prior to the manifold 110 as illustrated. Alternatively, plumbing lines can connect each of the mixing tank/reservoir 102a and mixing tank/reservoir 102b to independent injection pumps and/or manifolds to join downstream, such as at or proximate to the injection pipe 112. Likewise, plumbing lines 114 can connect a raw material tank, such as raw material tank 104a, directly to an injection pump 108 or downstream of a manifold, such as manifold 110, thereby bypassing a mixing tank and/or reservoir, such as mixing tank/reservoir 102a. The components of system 100 and their arrangement are exemplary, but many modifications can be made to accomplish a particular injection mycoremediation mission.

In some embodiments, the raw material tank 104a and/or raw material tank 104b are containers or reservoirs that are configured to store and/or source ingredients for injection mycoremediation. The raw material tank 104a and/or raw material tank 104b are approximately to approximately 300 gallons, but other sizes are possible. The raw material tank 104a and/or raw material tank 104b are composed of steel, aluminum, carbon fiber, plastic, or other metal, synthetic, or composite material. The injection materials stored can include a variety of liquids, solids, or mixtures, including any of fungus, mycelium, wood chips, enzymes, carbon, bacteria, microbes, fiber, water, oil, polymers, iron filings, vegetable oil, persulfate, hydroxide, or other ingredients disclosed herein or equivalent thereto. Using one or more plumbing lines 114, gravity, a feeder, a pump, a duct, or other dispenser, the raw material tank 104a and/or raw material tank 104b can source ingredients to one or more of the mixing tank/reservoir 102a and/or mixing tank/reservoir 102b. Alternatively, the raw material tanks 104a and/or raw material tank 104b can source material directly to an injection pump 108 without first entering a mixing tank/reservoir, such as mixing tank/reservoir 102a or mixing tank/reservoir 102b. Additionally, either of the raw material tanks 104a and/or raw material tank 104b can source material jointly to one or more mixing tanks/reservoir, such as mixing tank/reservoir 102a. One or more dosing pumps can control an ordered sequence of sourcing from one or more of the raw material tanks 104a and/or raw material tank 104b.

In additional embodiments, the mixing tank/reservoir 102a and/or the mixing tank/reservoir 102b are configured to mix injection materials. The mixing tank/reservoir 102a and/or the mixing tank/reservoir 102b can be approximately 5 to 300 gallons, but other sizes are possible. The mixing tank/reservoir 102a and/or the mixing tank/reservoir 102b can be composed of steel, aluminum, carbon fiber, plastic, or other metal, synthetic, or composite material. Either of the mixing tank/reservoir 102a and/or the mixing tank/reservoir 102b include one or more dry material feeders, one or more dry material eductor, one or more liquid dosing manifolds, one or more bulk dry feed systems, one or more fungal sources, and/or connections to one or more raw material tanks or reservoirs, such as raw material tank 104b. The mixing tank/reservoir 102a and/or the mixing tank/reservoir 102b can be equipped with a slight conical base, such as with an approximately 1" to approximately 3" slope terminating at a drain plug. Internal to the mixing tank/reservoir 102a and/or mixing tank/reservoir 102b includes one or more splash fins and/or a mixer. A mixer motor and/or gear box can be coupled to the mixer of the mixing tank/reservoir 102a and/or the mixing tank 102b, such as a 0.5 to 5 hp electric or gas motor at approximately 1000 RPM to approximately 5000 RPM. A lid of the mixing tank/reservoir 102a and/or mixing tank/reservoir 102b includes a hinge with a friction or other locking mechanism that exposes one or more couplers, such as 1" or 2" full couplers. The mixing tank/reservoir 102a and/or the mixing tank/reservoir 102b can independently mix the same or different injection materials simultaneously or in series. For instance, to maintain continuity and minimize disruption of injection remediation, the mixing tank/reservoir 102a can be dispensing an injection material formerly mixed, while the mixing tank/reservoir 102b is preparing an additional batch of the same injection material for subsequent dispensation. Alternatively, to isolate injection materials that could chemically react or that are designed to inject at different pressure, the mixing tank 102a can be dispensing a first injection material of fungus, for example, while the mixing tank 102b can simultaneously be dispensing a second injection material of fluid, whereby the first and second injection materials are sequentially injected via one or more injection heads 112 using dual manifolds 110, for example.

In one embodiment, one or more load sensors, such as load sensor 116a, are disposed below or otherwise support any one or more of a mixing tank, reservoir, or raw material tank. The one or more load sensors are configured to convert downward force exerted by mass or weight into one or more electrical signals. The resultant output of the one or more load sensors is used to determine a weight.

In further embodiments, the system includes one or more dosing pumps, such as dosing pump 106a and dosing pump 106b. Each of the mixing tanks/reservoir 102a and mixing tank/reservoir 102b include a dosing pump, but also any of the raw material tanks 104a and 104b may be associated with a respective dosing pump. Certain ones of the reservoirs, raw material tanks, or mixing tanks can include zero, one, or a plurality of dosing pumps. Additionally, any of the dosing pumps can operate to transfer material to or between one or more reservoirs, raw material tanks, or mixing tanks. The dosing pumps can further be used to source injection material from any of the reservoirs, raw material tanks, or mixing tanks and deliver the same to a mixture line, an injection pump, a manifold, an injection head, and/or other plumbing.

In further embodiments, the system 100 includes an injection pump 108, which can include a D35 hydraulic injection pump, a 3L8 hydraulic injection pump, a centrifugal-type electric injection pump, or any other pressurizing pump. The injection pump 108 operates to pressurize the injection material or injection material mixture and force the injection material through the one or more injection pipe 112. A plurality of injection pumps 108 may be used, such as with a plurality of or dual manifolds 110 that operate to independently deliver respective injection materials or injection material mixtures at the injection mycoremediation site 101. The dual or plurality of manifold 110 options are usable in contexts where chemical reactions may take place between injection materials and/or where injection material isolation is desired until a particular point in the system 100 or at the site 101, such as when differential pressure is desired or required between different injection materials. Alternatively, a series of injection pumps 108 can operate over lengths of plumbing to repressurize injection material due to pressure loss along a length of plumbing 114 or to further boost pressure of injection material. In certain embodiments, the injection pipes 112 comprise a plurality of injection pipes extending from a multi-ported manifold 110. For instance, the manifold 110 can include approximately 2 to 30 auxiliary ports each extending via flexible lines such as wire braided high-pressure-rated flexible tubing to respective injection pipes 112. The injection pipes 112 are positioned approximately 2 to 30 feet apart to collectively impact a subsurface zone at the injection remediation site 101. Other configurations of injection pipes 112 are within the scope of the present disclosure.

For example, system 100 can store species of Pearl Oyster, Turkey Tail, Phoenix Oyster, King Stropharia, or other fungus or mycelium; media of water, liquid, sawdust, seeds, grass, enzymes, carbon, sugar; and/or gases or gaseous solutions in one or more of the reservoirs 102. The one or more dosing pumps 106 are usable to transfer any of the stored ingredients between reservoirs 102, such as for mixing to create inoculation mixtures. Such inoculation mixtures may include, for example, a liquid culture of aerobic fungal decomposers, myceliated sawdust of aerobic fungal decomposers, inoculated seeds, encapsulated enzymes, or the like. The inoculation mixture in one or more reservoirs 102 is deliverable under pressure using the one or more injection pump 108 via the one or more plumbing lines 114 via the one or more injection pipes 112 into the mycoremediation site 101. A fracture media stored in a separate reservoir 102 can be delivered under higher pressure prior to the inoculation mixture, such as using one or more injection pumps 108. The injection pump 108 can be variably adjusted to one or more different pressure settings or a plurality of different injection pumps 108 can be employed to generate different pressures for the inoculation mixture and/or fracture media.

Figure 2:
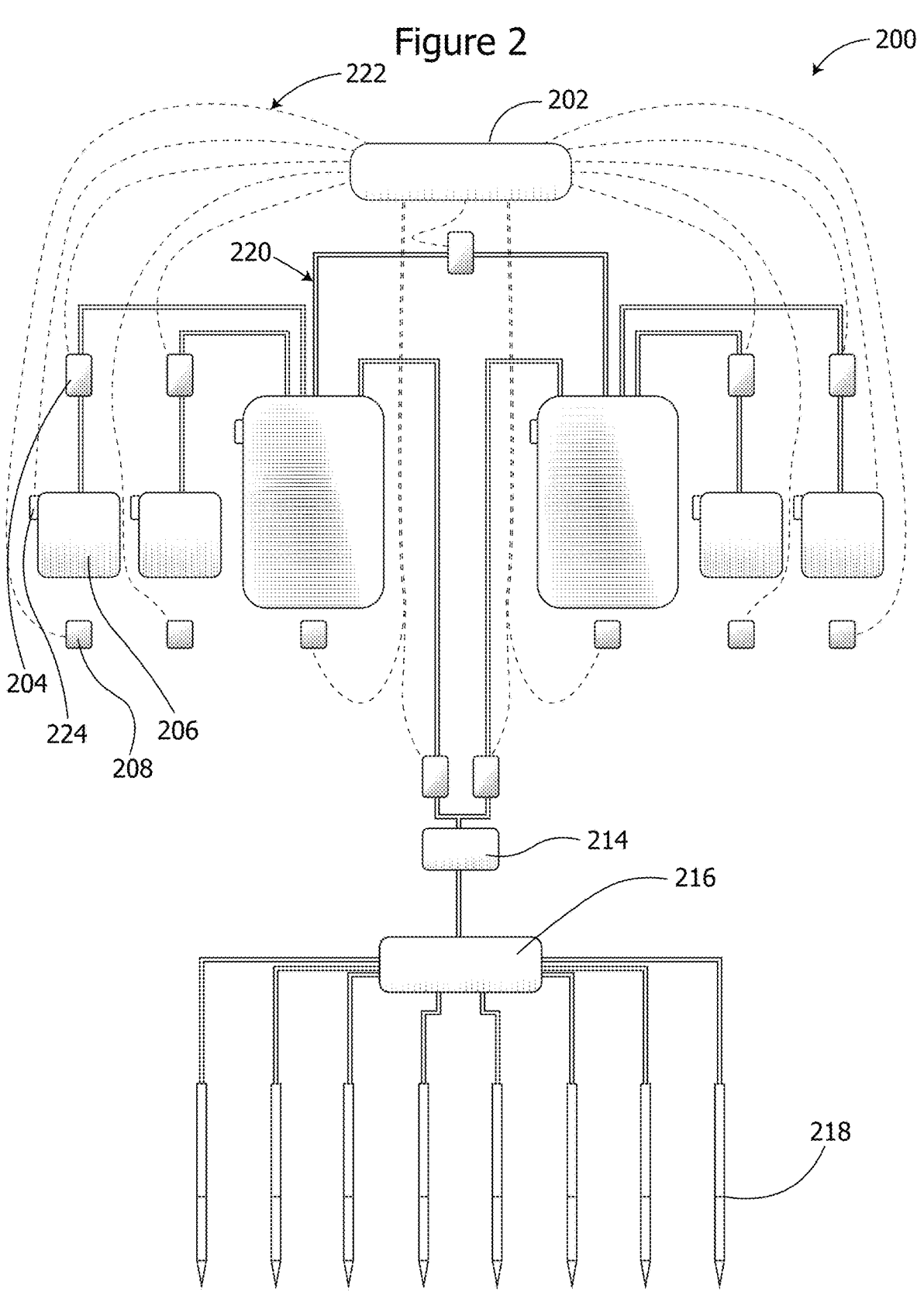
FIG. 2 is a component diagram of an injection remediation system, in accordance with an embodiment.

FIG. 2 is a component diagram of an injection remediation system, in accordance with an embodiment. In one embodiment, a injection remediation system 200 includes, but is not limited to, a first reservoir 206 configured to contain first material, the first reservoir including a first load sensor 208 and a first dosing pump 204 for sourcing the first material; at least one injection pipe 218; one or more plumbing lines 220 connecting the first reservoir 206 to the at least one injection pipe 218; at least one processor 202 configured to control the first dosing pump 204 to maintain or establish a specified flow volume, mass, rate, or ratio associated with the first material. The processor 202 is electrically coupled via one or more conductors 222 to any of the load sensor 208, the level sensor 224, and/or the dosing pump 204. Optionally, the reservoir 206 includes a level sensor 224 configured to output information associated with a volume or level of the first material within the reservoir 206. An injection pump pressurizes the first material for distribution via the manifold 216.

The system 200 can include a different arrangement of any of the components in order to meet the requirements of one or more injection mycoremediation missions. For instance, the processor 202 can comprise a plurality of processors and/or can include electronics, circuitry, integrated circuits, memory, software, or other computer modules configured to implement operations disclosed herein. The reservoir 206 can comprise one or more reservoirs, holding tanks, dispensers, mixers, or other containers, including a plurality of raw material tanks and/or mixing tanks configured to store and/or mix one or more injection materials, such as fungus, mycelium, sawdust, fiber, carbon, enzymes, microbes, liquid, dissolved gas solution, or any other ingredient disclosed herein or equivalent thereto. Any of the one or more reservoirs 206 can include a load sensor 208 and/or a level sensor 224. Thus, in an instance where two reservoirs 206 are provided, each of the two reservoirs 206 can include an independent load sensor 208 and/or an independent level sensor 224. A dosing pump 204 can also be provided for each of the one or more reservoirs to enable independent dosing and/or metering of injection material from the respective one or more reservoirs 206. The dosing pump 204 can be configured to support flow of injection material from one or more reservoirs 206 to the injection pump 214 or, alternatively, can be configured to support flow of injection material from one or more reservoirs 206 into one or more other reservoirs 206, such as to mix injection materials together. While one injection pump 214 has been depicted, it is within the scope of the present disclosure to include two or more injection pumps 214. Likewise, a plurality of manifolds 216 can be provided to distribute injection material to one or more injection pipes 218. Therefore, in certain embodiments, the plumbing lines 220 are configured to combine one or injection materials prior to the injection pump 214 for distribution via the manifold 216. And, in other embodiments, the plumbing lines 220 are configured to isolate at least some injection material in via one or more other injection pumps 214 and/or manifolds 216 to maintain separation of the at least some injection material. The one or more injection pipes 218 can include one injection pipe 218 or a plurality of injection pipe 218. The one or more injection pipes 218 can be configured identically and/or have one or more variations, such as with size, dimension, or orifices differences. The one or more injection pipes 218 can be configured to output the same injection material or output different injection material among the one or more injection pipes 218. Furthermore, in some embodiments, flow rate sensors are disposed at any position in the plumbing lines 220 to directly measure flow rate throughput. For instance, one flow rate sensor can be positioned in plumbing in-line with a first reservoir 206 and a second flow rate sensor can be positioned in-line with an injection pump 214. In such embodiments, the one or more processors 202 can obtain flow rate signals associated with the flow rate sensor for determining and/or monitoring flow rate of an injection material at one or more locations in the plumbing lines 220. The plumbing lines 220 can consist of aluminum, braided steel, copper, polyurethane, or other metal, plastic, synthetic, composite, or rubber material. The conductors 222 can consist of power, ground, analog, and/or data wires composed of copper, tin, gold, composite, or other conducting material, including single and multi-conductor cables. Additionally, in certain embodiments, a user interface is provided that is configured to enable interaction with the one or more processors 202 or any other component of the system 200. The user interface can include a local user interface that is hardwired to the system 200, such as a touch screen display and/or keypad, or can include a wireless user interface, such as an smartphone, tablet, and/or remote computer system. The system 200 can include a network, beacon, or wireless interface, such as BLUETOOTH or WIFI.

For example, system 200 can store species of Pearl Oyster, Turkey Tail, Phoenix Oyster, King Stropharia; media of liquid, sawdust, seeds, grass, enzymes, sugar; and/or gases or gaseous solutions in one or more of the reservoirs 206. The dosing pumps 204 are usable to transfer any of the stored ingredients between reservoirs 206, such as for mixing to create inoculation mixtures. Such inoculation mixtures may include, for example, a liquid culture of aerobic fungal decomposers, myceliated sawdust of aerobic fungal decomposers, inoculated seeds, encapsulated enzymes, or the like. The inoculation mixture in one or more reservoirs 206 is deliverable under pressure via the one or more plumbing lines 220 via the one or more injection pipes 218. A fracture media stored in a separate reservoir 206 can be delivered under higher pressure prior to the inoculation mixture, such as using one or more injection pumps 214. The injection pump 214 can be variably adjusted to one or more different pressure settings or a plurality of different injection pumps 214 can be employed to generate different pressures for the inoculation mixture and/or fracture media.

Figure 3:
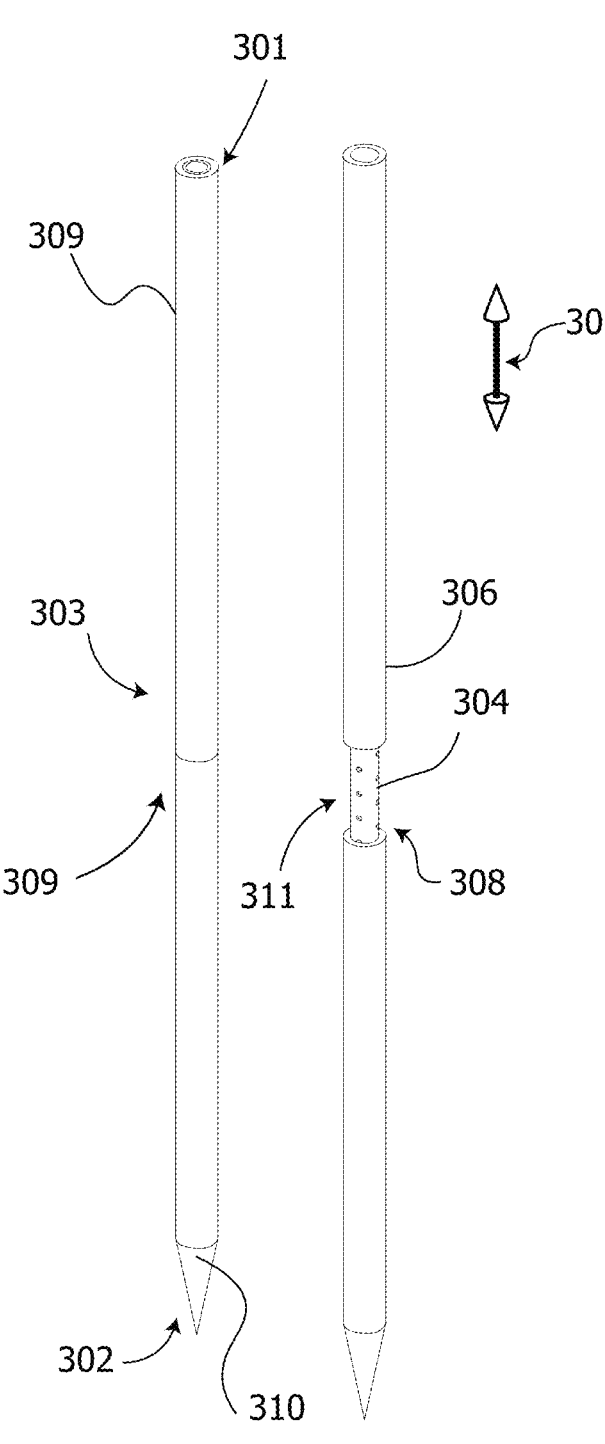
FIGS. 3-4 are perspective views of a device for mycoremediation, in accordance with an embodiment of the invention.
Figure 4:
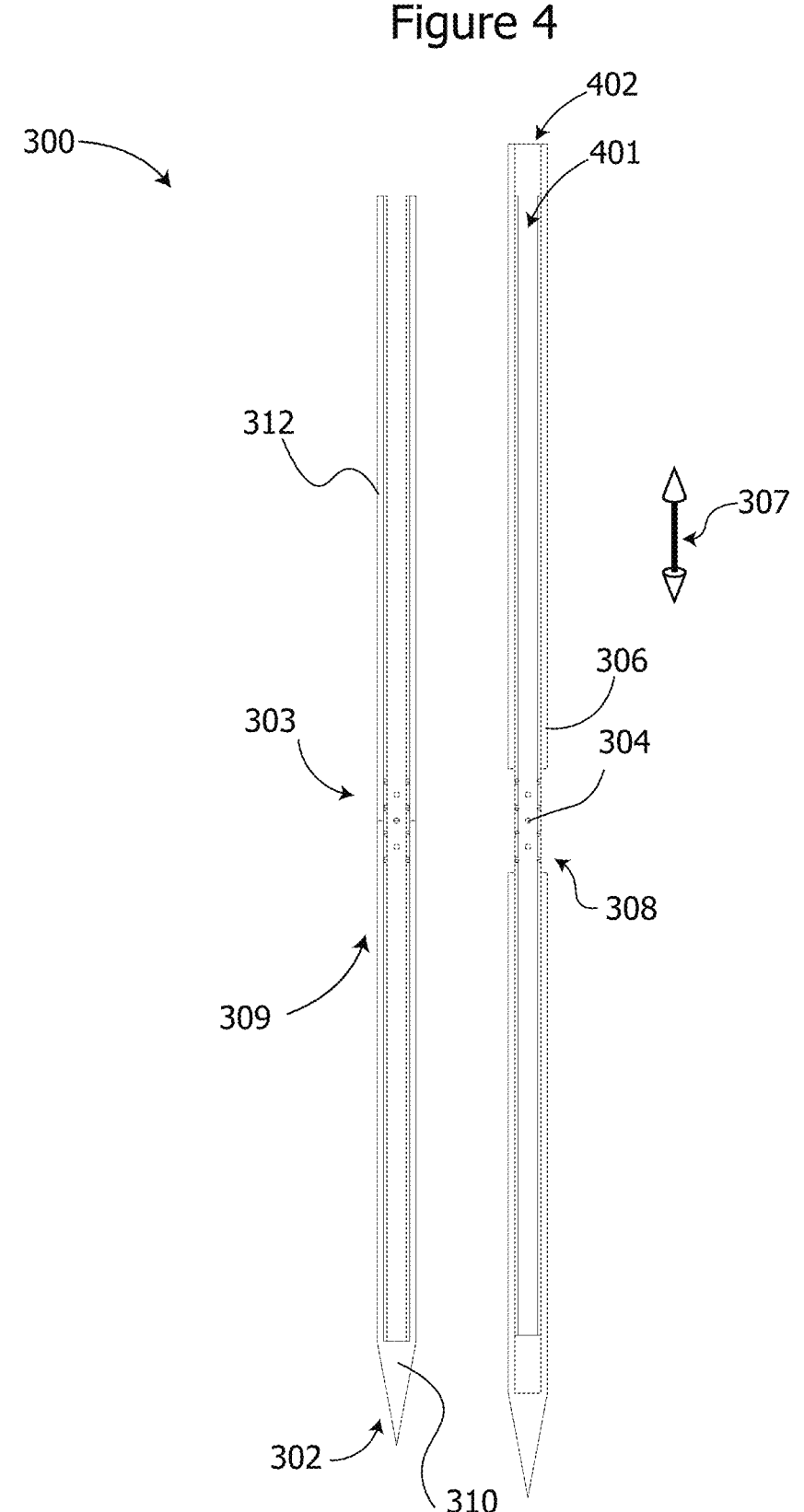
Figure 6:
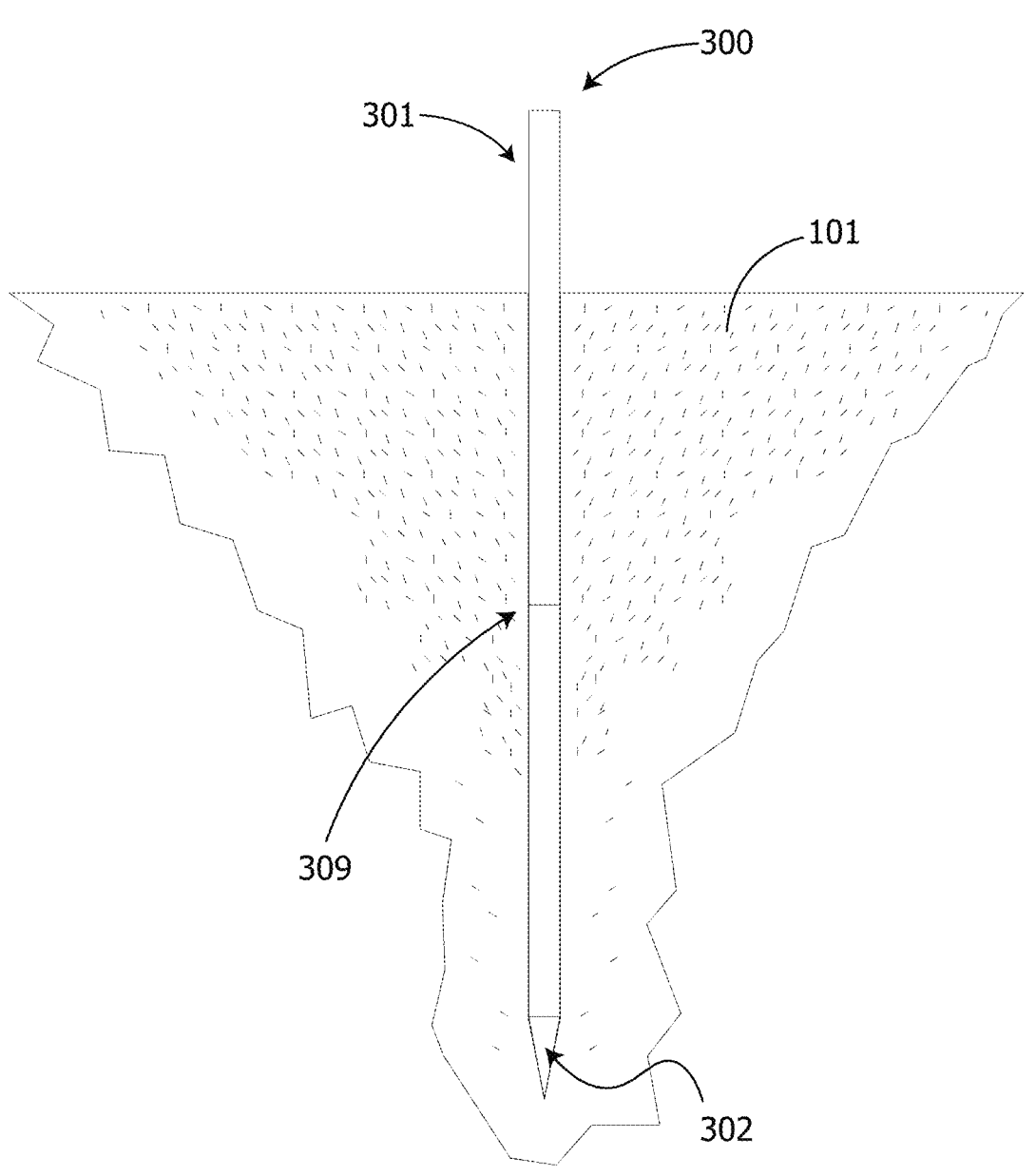
FIGS. 6-8 are environmental perspective views of a device for mycoremediation, in accordance with an embodiment of the invention.

FIGS. 3-4 are perspective views of a device for mycoremediation, in accordance with an embodiment of the invention. APPENDIX B includes pictures of various embodiments of the device. In one instance, a device 300 for in-situ mycoremediation includes, but is not limited to, a rod casing 312 having a top end 301, a bottom end 302, and a sidewall 303 with one or more perforations 304, the sidewall defining an internal channel 401 that extends from an intake opening 402 (FIG. 4) on the top end 301 to the one or more perforations 304; a sleeve 306 that extends around at least part of the rod casing 312 and that is slidable 307 between at least a first position 303 that covers the one or more perforations 304 and a second position 308 that at least partly uncovers the one or more perforations 304; and a plumbing line 114 (FIG. 1) linked to the intake opening and configured to facilitate forcible injection of one more fungal mixtures and/or air via the one or more perforations when the sleeve 306 is in the second position 308. In certain embodiments, the rod casing 312 is cylindrical with a tapered tip 310 defining the bottom end 302. In a further embodiment, the sidewall 303 includes a recessed segment 311 where the one or more perforations 304 are located. In a further particular embodiment, wherein the sleeve 306 is disposed within a recessed segment 311 of the sidewall 303. In yet another embodiment, the sleeve 306 includes a detent friction lock to maintain the sleeve 306 in the first position 309 and/or the second position 308. In one embodiment, the sleeve 306 is friction mounted within a recessed segment 311 of the sidewall 303. In another embodiment, the sleeve is electromagnetically movable between the first position 309 and/or the second position 308. In certain embodiments, the sleeve 306 is configured to be positioned at a point between the first position 309 and the second position 308 to partially expose the one or more perforations 304. In yet another embodiment, the sleeve 306 is friction pushed to the first position 309 closer to the bottom end 302 of the rod 312 when the rod 312 is pushed into a subsurface (FIGS. 6 | 7). In a further embodiment, the sleeve 306 is friction pulled to the second position 308 further from the bottom end 302 of the rod 312 when the rod 312 is retracted at least partly in the subsurface (FIGS. 6 | 7). In certain embodiments, the one or more perforations 304 are positioned to be exposed at the second position 308 of the sleeve 306. In some embodiments, the device 300 is configured to facilitate forcible injection of one or more fungal mixtures via the one or more perforations 304. Also, in other embodiments, the device 300 is configured to facilitate forcible injection of air via the one or more perforations 304. In yet a further embodiment, the sleeve 306 is slidable to one or more intermediate positions between the first position 309 and the second position 308.

The retractable bottom-up injection tool 300 disclosed herein can by employed in direct push or CPT injection applications with high or low viscosity reagents, especially in low to medium pressure or flow applications. In one particular instance, the rod casing 312 is approximately 24-48 inches in length with an outside diameter of 1.5 inches and an inside diameter of 1 inch. The recessed segment 311 or screen of perforations 304 has an outside diameter of 1 inch and an inside diameter of ¾ inch and a length of 1 inch to multiple feet. Other sizes and shapes are within the scope of the disclosure, including different lengths, diameters, and shapes. The perforations 304 can be one or more perforations and vary in size and shape. In one particular instance, the perforations 304 are a distributed array of circular orifices in the recessed segment 311, each approximately ¹⁄₁₆-¼ inch in diameter. Other shapes such as square, rectangle, triangle, oval, or other regular or irregular shape are possible. As well, other sizes are also possible, including much smaller diameter holes that are on the order of approximately 1 mm in diameter. Optionally, perforations 304 may be formed from a mesh, weave, braid, filter, screen, or other material that enables liquid or gas to permeate. The material of the rod 312 can include steel, copper, aluminum, or other metal alloy. Optionally, all or part of the rod 312 can be formed from carbon fiber, fiberglass, plastic, or other similar composite material. Furthermore, in certain instances, sleeve 306 is fixed and does not slide, thereby fixedly exposing the perforations 304. Alternatively, sleeve 306 can be configured to rotate about threads to expose and conceal the perforations 304.

Figure 5:
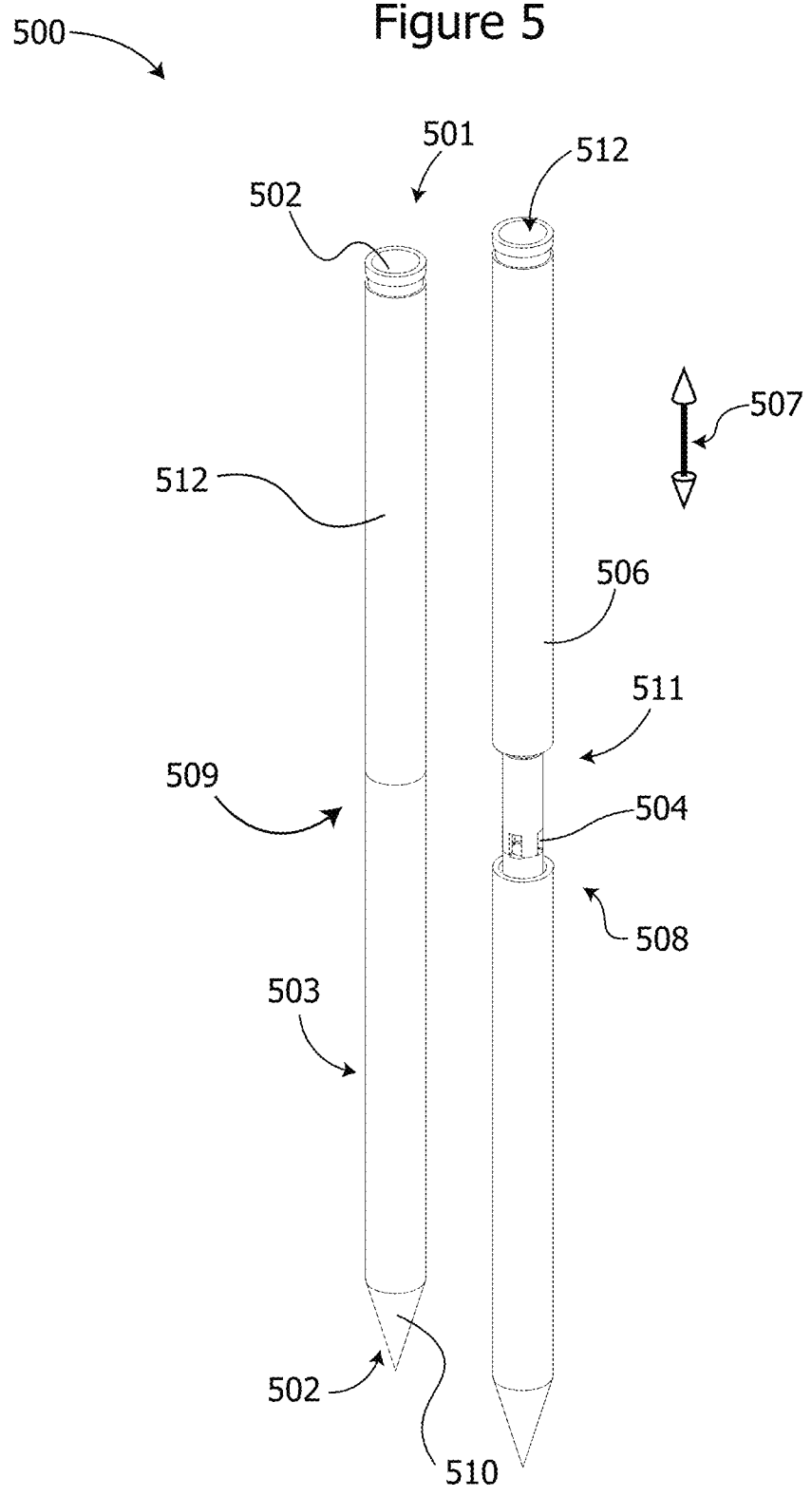
FIG. 5 is perspective view of a device for mycoremediation, in accordance with an embodiment of the invention.

FIG. 5 is perspective view of a device for mycoremediation, in accordance with an embodiment of the invention. APPENDIX B includes pictures of various embodiments of the device. In one instance, a device 500 for in-situ mycoremediation includes, but is not limited to, a rod casing 512 having a top end 501, a bottom end 502, and a sidewall 503 with one or more perforations 504, the sidewall defining an internal channel 512 that extends from an intake opening on the top end 501 to the one or more perforations 504; a sleeve 506 that extends around at least part of the rod casing 512 and that is slidable 507 between at least a first position 503 that covers the one or more perforations 504 and a second position 508 that at least partly uncovers the one or more perforations 504; and a plumbing line 114 (FIG. 1) linked to the intake opening and configured to facilitate forcible injection of one more fungal mixtures and/or air via the one or more perforations when the sleeve 506 is in the second position 508. In certain embodiments, the rod casing 512 is cylindrical with a tapered tip 510 defining the bottom end 502. In a further embodiment, the sidewall 503 includes a recessed segment 511 where the one or more perforations 504 are located. In a further particular embodiment, wherein the sleeve 506 is disposed within a recessed segment 511 of the sidewall 503. In yet another embodiment, the sleeve 506 includes a detent friction lock to maintain the sleeve 506 in the first position 509 and/or the second position 508. In one embodiment, the sleeve 506 is friction mounted within a recessed segment 511 of the sidewall 503. In another embodiment, the sleeve 506 is electromagnetically movable between the first position 509 and/or the second position 508. In certain embodiments, the sleeve 506 is configured to be positioned at a point between the first position 509 and the second position 508 to partially expose the one or more perforations 504. In yet another embodiment, the sleeve 506 is friction pushed to the first position 509 closer to the bottom end 502 of the rod 512 when the rod 512 is pushed into a subsurface (FIGS. 6 ǀ 7). In a further embodiment, the sleeve 506 is friction pulled to the second position 508 further from the bottom end 502 of the rod 512 when the rod 512 is retracted at least partly in the subsurface (FIGS. 6 ǀ 7). In certain embodiments, the one or more perforations 504 are positioned to be exposed at the second position 508 of the sleeve 506, wherein the second position 508 is closer to the top end 501 of the rod 512. In some embodiments, the device 500 is configured to facilitate forcible injection of one or more fungal mixtures via the one or more perforations 504. Also, in other embodiments, the device 500 is configured to facilitate forcible injection of air via the one or more perforations 504. In yet a further embodiment, the sleeve 506 is slidable to one or more intermediate positions between the first position 512 and the second position 508.

The retractable injection tool 500 can be employed in direct push or CPT injection applications with high or low viscosity reagents using bottom up injection, especially in high pressure or flow applications. In one particular embodiment, the rod casing 512 has a length of 48 inches, an outside diameter of 2.25 inches, and an inside diameter of 1.75 inches. Other sizes and shapes are within the scope of the disclosure. The injection ports or perforations 504 include four windows each of 0.5×1 inch orifice size and each with a conical or tear drop shape. Other shapes such as square, rectangle, triangle, oval, or other regular or irregular shape are possible. As well, other sizes are also possible, including much smaller diameter holes that are on the order of approximately 1 mm in diameter. Optionally, perforations 304 may be formed from a mesh, weave, braid, filter, screen, or other material that enables liquid or gas to permeate. The material of the rod 312 can include steel, copper, aluminum, or other metal alloy. Optionally, all or part of the rod 312 can be formed from carbon fiber, fiberglass, plastic, or other similar composite material. Furthermore, in certain instances, sleeve 506 is fixed and does not slide, thereby fixedly exposing the perforations 504. Alternatively, sleeve 506 can be configured to rotate about threads to expose and conceal the perforations 504.

In certain embodiments, the injection remediation system 100 is configured to utilize a plurality of injection pipes 112 that include one or more of the device 300 and/or device 500. For example, the injection remediation system 100 can include a plurality of device 300 and a plurality of device 500 that are intermixed, but separately plumbed to one or more different pressurized plumbing lines 114 and/or sourced from one or more different reservoirs 102. Thus, at one injection mycoremediation site 101, the device 500 may be employed first to inject higher pressure fracture medium and the device 30 may be employed second to inject lower pressure fungi and/or mycelium, oxygen, or air. Thus, a plurality of different device 300 and device 500 can be used in parallel or sequentially to deliver different media at different pressures efficiently during a remediation period.

Figure 7:
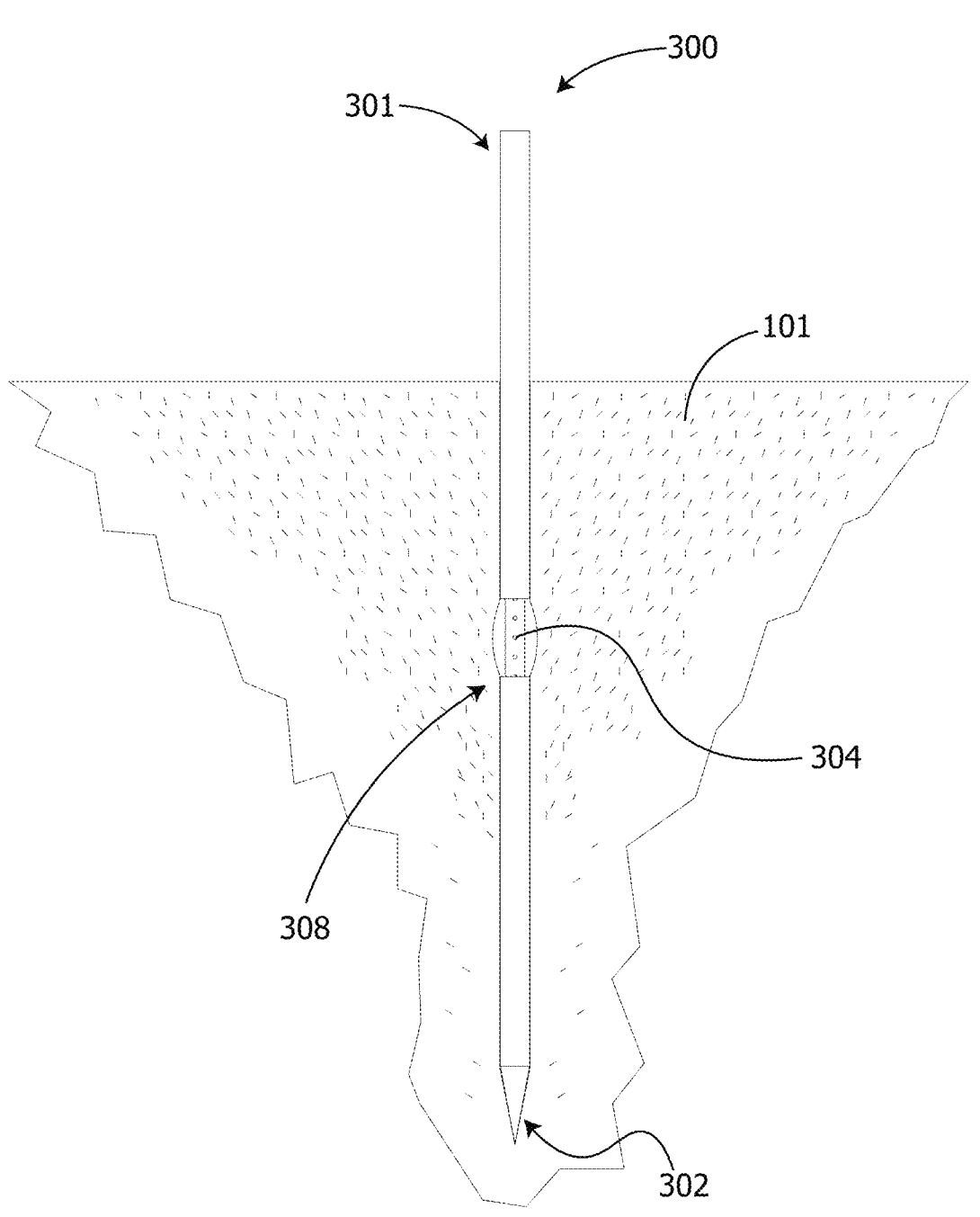
Figure 8:
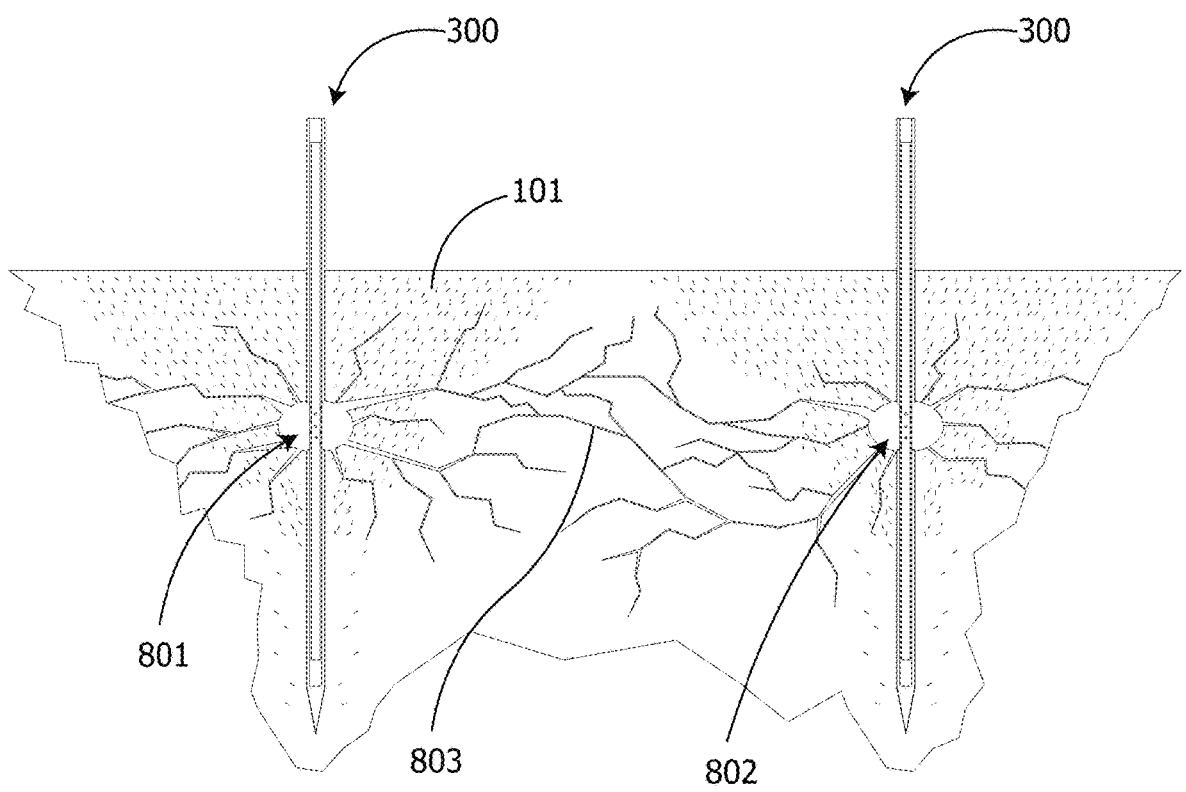

FIGS. 6-8 are environmental perspective views of a device for mycoremediation, in accordance with an embodiment of the invention. In one instance, the injection head 300 is driven into a site 101 for mycoremediation. The device 300 has at least two configurations of a first position 309 where the perforations are covered and a second position 308 where the perforations are uncovered and exposed to the site 101. Pushing the top end 301 of the device 300 downward into the site 101 collapses the device 312 into the first position 309. Pulling or retracting the device 300 at least partly from the site 101 using the top end 301 extends the device 312 into the second position 308. Alternatively, using a threaded embodiment, rotating the device 300 at the top end 301 in one direction can conceal the perforations 304 in the first position 309. Oppositely, rotating the device 300 at the top end 301 in an opposing direction can expose the perforations 304 in the second position 308. The degree to which the perforations 304 are exposed, or the partial position of the device 300 between the first position 309 and the second position 308 can be controlled based upon an extent of pulling force, rotational force, or, in certain instances, using one or more of a stopper pin, retainer pin, spacer, or locking nut. The device 300 is illustrated as being partially inserted into the site 101, but the device 300 can be driven or forced to various depths in order to position the perforations 304 deeper or shallower within the site 101. For instance, the device 300 can be driven fully below and into the site 101 such that the top end 301 is completely below a top surface of the site 101. In certain embodiments, the device 300 can be stepped through different depths sequentially, to fracture and/or inject various mycoremediation material within different depth planes of the site 101. A plurality of devices 300 can be used to create a 3D matrix of fracture/injection locations at different X, Y, and Z coordinates.

In one embodiment, as depicted in FIG. 8, a plurality of injection pipes 300 are driven or vibrated into the ground site 101 with a "direct push" type rig. As the zone of interest within the site 101 is reached, the rods 300 are retracted slightly (e.g. 1 to 18 inches), which exposes a series of injection slots in the drive pipe 300. A propagation notch or fracture 802 is started using pressurized water. This notch 802 is about 4 to 6-inches deep into the lateral soil horizon. An inoculation fluid is then pumped into the pipe 300 under pressure until the overburden pressure of the soil in site 101 is exceeded and the horizon fractures. The lateral fracture then extends out horizontally and is approximately 1-inch wide and has approximately a 30-degree radial expression. The tooling 300 has the capability to inject both aqueous and viscous slurry solutions, such as those including grain/sawdust material and mycelium as a slurry. In certain embodiments, tooling 300 allows for higher hydraulic pressure to help create fractures in low porosity soils 101 and allows for lower hydraulic pressure to support injection of mycelium and/or enzymes at a lower sustained pressure.

The devices 300 therefore enable efficient robust growth of fungi in a hyphal network 803 for mycoremediation. That is, the devices 300, when used in aquatic or terrestrial environments 101, soil porosity, permeability, and hydraulic conductivity are first increased by fracturing a subsurface 101 with a first fluid, such as a carbon and/or water solution, at a high pressure. Then, a slurry of fungi with a food source is disbursed into the disturbed subsurface under a pressure that is lower than that of the first fluid to initiate and support colonization and/or formation of a matrix of mycelium 803. The matrix of mycelium itself increases soil porosity and produces extracellular ligninolytic enzymes that breakdown and degrade pollutants. Further, the matrix of mycelium acts to absorb and/or filter various pollutants, such as heavy metals to support remediation. Additionally, the area of influence can be increased via the addition of more sugar solution to encourage the migration of fungus. More solution may be added to the original injection pipe 300, or via one or more additional injection pipes 300 to encourage hyphal fungal growth. Additionally, either before, after, or during any of the foregoing operations, an optional injection of oxygen or air can be forcibly injected to the subsurface or encouraged through venting. Thus, the device 300 is configured to remain in-situ with passive ventilation of air via the one or more perforations. It is also possible to restrict access to air in the subsurface for anoxic substrates, such as by capping the device 300 at the top end 301.

FIG. 9 is a flow diagram of a process for mycoremediation, in accordance with an embodiment of the invention. In one instance, a process for in-situ mycoremediation 900 is provided, including at least driving one or more rod casings into a subsurface zone at 901, the one or more rod casings including one or more orifices that are covered; partially retracting the one or more rod casings to expose the one or more orifices at 902; forcible injecting a fluid via the one or more orifices to initiate fracture in the subsurface zone at 903; forcibly injecting a fungal nutrient mixture via the one or more orifices into the subsurface zone at 904; and ventilating the subsurface zone with air via the one or more orifices to support a hyphal network of mycelium in the subsurface zone at 905, which in some cases can include pressurized air.

In one embodiment, a liquid fungal mixture can be established as follows, in small batch as described or in large batch with substantially equivalent ratios and steps. Mix approximately 500 mL of non-chlorinated water, approximately 2 Tbsp of dextrose, and approximately 2 Tbsp of malt extract over low heat to dissolve. Pressure cook the mixture at approximately 15 PSI for approximately 20 minutes. Inoculate the mixture with fungi and place inoculated mixture in a dark environment with stable room temperature. Aerate for approximately 30 minutes daily for approximately 2-3 weeks. Refrigerate the liquid mycelium rich fungal mixture until use.

In certain embodiments, the liquid nutrient mycelium mixture is established next by adding a carbonous substrate to the liquid mycelium mixture to enable the fungal mycelium to do remediation work through decomposition and enzymatic production. In one particular embodiment, sawdust is used as the carbonous substrate and sawdust spawn is created as follows, in small batch as described or in large batch using the same approximate ratios and steps. First, combine hardwood (alder) sawdust and with ½ cup wheat or rice bran and ¼ cup gypsum to jump start nutrition. Hydrate each separately or together. Soak sawdust in moisture for a few hours to overnight. Drain the sawdust mixture such that it is moist but not wet. Pack the sawdust mixture into an airtight sterile container. Then, inoculate the sawdust mixture with the mycelium mixture using an approximate 10% inoculation ratio (1:10 spawn to substrate).

The nutrient mycelium mixture is usable for injection via the devices and systems described herein. However, many other methods of producing fungal mixtures are possible and usable with the present invention for injection remediation.

The present invention may have additional embodiments, may be practiced without one or more of the details described for any particular described embodiment, or may have any detail described for one particular embodiment practiced with any other detail described for another embodiment. For instance, the hyphal network can alternatively be used to increase the hydraulic conductivity of the soil by creating pathways through interstitial grains. The grains can be "locked" together with a precipitate then can stabilize the soil to mitigate spread failure, circular failure, or prevent water erosion. Once the soil has a lower hydraulic conductivity, different mixtures of microbial fluid or inoculant can then optionally be added to address any subject condition.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

The invention claimed is:

1. An injection device for remediation, the injection device comprising:

a rod casing having a sidewall with (i) a first portion toward a bottom end having a first outside diameter and (ii) a recessed segment toward a top end having a second outside diameter that is less than the first outside diameter, the recessed segment including one or more perforations located in the sidewall; and a sleeve that extends around at least part of the recessed segment of the rod casing, the sleeve being movable along a long axis of the rod casing between at least a first position that covers the one or more perforations and a second position that at least partly uncovers the one or more perforations, wherein the injection device is configured to inject one more remediation materials via the one or more perforations.

2. The injection device of claim 1, wherein the top end includes an intake opening, the bottom end includes a tip, and the sidewall defines an internal channel that extends from the intake opening to the one or more perforations.

3. The injection device of claim 1, wherein the one or more perforations include a screen.

4. The injection device of claim 1, wherein the one or more perforations are defined by a tear drop shape.

5. The injection device of claim 1, wherein the sleeve extends entirely around the recessed segment of the rod casing.

6. The injection device of claim 1, wherein the sleeve is slidably pushed to the first position and pulled to the second position.

7. The injection device of claim 1, wherein the sleeve is rotated in one direction to the first position and in an opposite direction to the second position.

8. The injection device of claim 1, wherein the sleeve is movable to one or more intermediate positions between the first position and the second position.

9. The injection device of claim 1, wherein the first position and/or the second position are defined by a stopper pin.

10. The injection device of claim 1, wherein the injection device is configured to forcibly inject one more remediation materials into a subsurface via the one or more perforations.

11. The injection device of claim 1, wherein the injection device is configured to inject a gaseous medium.

12. The injection device of claim 1, wherein the injection device is configured to inject the following type of remediation material: mycelium.

13. The injection device of claim 1, wherein the sleeve shares the first outside diameter of the rod casing.

14. The injection device of claim 1, wherein the one or more perforations include two or more perforations that are radially distributed about the sidewall of the rod casing.

15. The injection device of claim 1, wherein the one or more perforations include two or more perforations that are distributed along the long axis of the rod casing.

16. The injection device of claim 1, wherein the sleeve is a hollow cylindrical body with an inner wall diameter that matches the second outside diameter of the recessed segment with tolerance for slidable engagement.

17. The injection device of claim 1, wherein the sleeve has a first end that engages an edge transition of the recessed segment to cover the one or more perforations.

18. The injection device of claim 1, wherein the sleeve and the rod casing combine to define a cylindrical body when the sleeve is in the first position.

19. The injection device of claim 1, wherein the first outside diameter is approximately 1.5 to 2.25 inches and the second outside diameter is approximately 1 to 1.75 inches.

20. The injection device of claim 1, wherein the injection device is approximately 24 to 48 inches in length.

* * * * *